May 1, 1956     T. R. SMITH ET AL     2,743,530

CONTROL FOR CLOTHES DRIERS

Filed April 14, 1952     2 Sheets-Sheet 1

INVENTORS
Thomas R. Smith and
Colby Weston Steward
BY J. X. Mosser
AGENT

May 1, 1956　　　T. R. SMITH ET AL　　　2,743,530
CONTROL FOR CLOTHES DRIERS
Filed April 14, 1952　　　　　　　　　　　　　　　2 Sheets-Sheet 2

INVENTORS
Thomas R. Smith and
Colby Weston Steward
BY J. K. Mosser
AGENT

United States Patent Office 2,743,530
Patented May 1, 1956

2,743,530

CONTROL FOR CLOTHES DRIERS

Thomas R. Smith and Colby Weston Steward, Newton, Iowa, assignors to The Maytag Company, Newton, Iowa, a corporation of Delaware Application April 14, 1952, Serial No. 282,093

10 Claims. (Cl. 34—45)

The invention relates to clothes driers and more particularly to control means for clothes driers to provide improved operation.

Driers used for removing moisture from clothing must be provided with control means of some type to terminate the heating period in order to prevent overheating and damage to the clothes, especially near the end of the drying operation.

In accordance with the invention, a tumbler type clothes drier is provided with means for heating the clothes to evaporate the moisture therein, a temperature responsive thermostat, positioned so as to be responsive to the temperature within the drying chamber, and a holding relay connected in series with the heating means circuit for delaying operation of a timer motor until after the thermostat is operated to deenergize the heating means. Upon deenergization of the heating means, the relay acts to prevent reenergization of the heating means even though the thermostat moves back to its closed position. An additional circuit is also provided for operating the drier for a timed interval in which case the holding relay is removed from the heating means circuit and the temperature responsive thermostat cyclically energizes the heating means to maintain the drying medium within safe operating limits. Also, in both arrangements, tumbling of the clothing is continued after the heating means has been deenergized to provide for cooling of the clothes being dried.

Accordingly, it is one of the objects of the invention to provide a tumbler type clothes drier with a relatively simply control arrangement which may be selectively operated by the operator to control the drying operation in several different ways.

It is another object of the invention to provide a control means for a tumbler type clothes drier which includes means for deenergizing the heating element if the temperature tends to exceed a predetermined value, the door is opened, or if the drive motor fails to rotate.

It is another object of the invention to provide a tumbler type clothes drier having heating means with control means including a holding relay which is manually operated to initiate the drying operation and automatically operated upon the drier attaining a predetermined temperature for terminating operation of the heating means.

It is still another object of the invention to provide a control arrangement for a tumbler type clothes drier which includes a holding relay manually operated to initiate the drying operation and automatically operated upon an operating condition to maintain the heating means deenergized and to energize a timing means for continuing the tumbling action for a predetermined length of time to reduce the temperature of the clothing being dried.

It is yet another object of the invention to provide a drum type tumbler clothes drier with heating means and temperature responsive control means mounted on and rotatable with the drum which is dependent upon the drive motor attaining a predetermined speed for energization.

Other objects, features, capabilities, and advantages are comprehended by the invention as will later appear and as are inherently possessed thereby.

Referring to the drawings.

Figure 1:
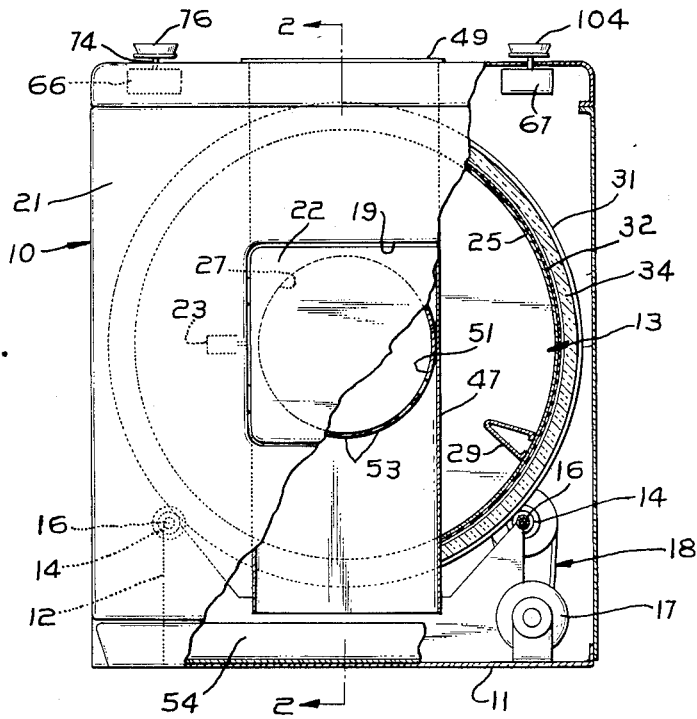
Figure 1 is a diagrammatic partial front plan view of a tumbler type clothes drier to which the improved control means may be applied.

Referring now more in detail to the drawings for one form of clothes drier embodying the control features of the present invention, there is shown an outer cabinet or casing 10 secured to a base frame construction 11 for completely enclosing the operating parts of the clothes drier. Projecting upwardly from the base 11 are a pair of spaced webs 12 which provide a support for a hollow clothes receiving rotatable tumbler or drum 13 mounted for rotation about its horizontal axis within a cradle formed by four spaced flanged friction rollers 14 carried on opposite ends of parallel spaced shafts 16. The drum 13 may be rotated by means of a pivotally mounted electric drive motor 17 through suitable speed reduction mechanism, such as, for example, a belt and pulley arrangement 18 which is operatively connected to one of the shafts 16 and pair of the rollers 14. When the motor is energized, the driven pulley rotates one of the shafts and the friction between the engaging portions of the rollers and the drum causes the same to rotate about its horizontal axis at a considerable speed reduction; i. e., between 35 and 50 R. P. M., while the opposite shaft carrying its pair of rollers merely acts as a rolling support.

The surrounding cabinet has an access opening 19 in its front wall 21 disposed about the horizontal axis of the drum 13 and a door or closure 22 adjacent the opening 19 is adapted to be opened or closed by the operator to either gain access to the drum or to seal the opening. Also, when the door is moved from one position to the other, it is adapted to engage a door switch 23 for a purpose to be hereinafter described.

The horizontally mounted drum 13 within the casing and defining the drying chamber 24 is a unitary structure and includes an imperforate cylindrical wall 25, a front end wall 26, having a single centrally located access opening 27 facing the access opening 19 in the front wall of the cabinet, and an imperforate vertical rear end wall 28 spaced in parallel relation to the front wall. A plurality of parallel lifting ribs or vanes 29 are secured to the inner periphery of the cylindrical wall to tumble the clothes, and the end walls 26 and 28 are provided with circumferential flanges 31 which rest on the rollers 14 and constitute the sole support for the drum in its horizontal position.

In order to evaporate the moisture in the clothing within the drum 13, heat must be applied thereto. One means for heating the drum is in the form of an electrical heating element 32 formed from a single, flat, long, thin and relatively wide strip of stainless steel, or other material having somewhat similar characteristics. This particular type heating element is preferable tightly wound over a thin strip of electrical insulation to cover substantially the entire outer periphery of the imperforate cylindrical wall 25 of the drum and its opposite ends are secured to suitable terminal posts 33 disposed within the recess provided by one of the elevating vanes 29. A heating element of this type uniformly heats the entire periphery of the drum, which, of course, heats the clothing in the drying chamber to evaporate the moisture or a high percentage thereof, and the overall temperature of the entire heating element is reduced considerably. Also, to improve the overall efficiency of the drier, the outer surface of the drum may be enclosed by heat insulating material 34.

While various means may be employed for supplying energy to the heating element 32, there is diagrammatically disclosed a collector ring assembly 35 mounted on the back portion of the rear wall 28 at the approximate axis of rotation of the drum. This collector ring assembly includes a relatively stationary non-metallic support 36 carrying the usual carbon brushes 37 held in engagement with a pair of spaced concentric collector rings 38 mounted on the outer face of a generally disc shaped rotatable insulating block 39, which is in turn anchored or secured to the rear wall 28 of the drum, and, of course, rotated therewith. The stationary support 36 is held against rotational movement by means of a flexible holding arm 41 whose lower end is anchored to the base. Electrical conductors 42 and 43 extend from their respective collector rings radially outwardly along the back of the drum and are directly connected to the opposite ends of the heating element 32 at the terminal blocks 33 in any suitable manner. The conductor 43 is connected in series with a fixed temperature responsive thermostat or limit switch 44, which, in this instance, is secured to the rear wall 28 of the drum adjacent its outer periphery and it operates to deenergize the heating element 32 when the temperature within the drying chamber 24 reaches or tends to exceed a predetermined safe value. Electrical energy is supplied to the heating element 32 from any suitable source of supply $L_1$ and $L_2$ under the control of control mechanism generally referred to at 46 (Figure 3) to be hereinafter described.

Figure 2:
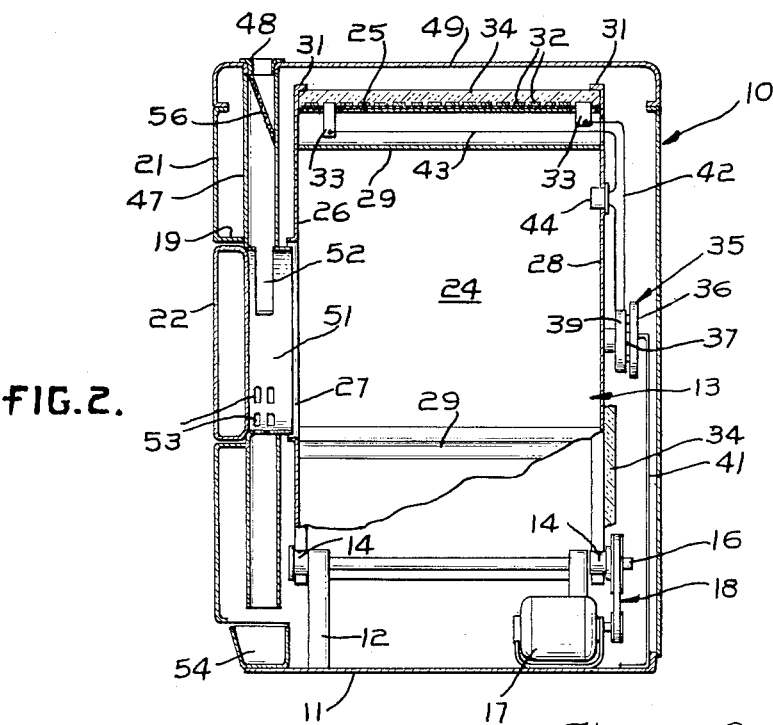
Figure 2 is a diagrammatic longitudinal vertical partial sectional view of the clothes drier taken generally along the line 2—2 of Figure 1.

Referring now more particularly to Figure 2, it can be seen that the front wall 26 on the drum is spaced from the front wall 21 of the cabinet 10 to provide room for an open-ended vertical fluid conducting rectangular duct or conduit 47. The upper open end of the duct is open to the ambient atmosphere through a grilled opening 48 provided in the top wall 49 of the cabinet, and the lower open end is disposed adjacent the base 11 and in direct communication with the relatively cool air thereat. Intermediate the lower and upper ends of the vertical duct 47 and in alignment with the aligned access openings 19 and 27 in the cabinet and front wall of the drum, respectively, the duct is provided with a suitable horizontal cylindrical passage 51 of approximately the same size as the access opening in the drum. This passage permits access to the interior of the drum for inserting or removing the clothing.

In order to provide means for connecting the drying chamber 24 with the ambient atmosphere and to allow the vapor evaporated from the clothing to escape, the upper portion of the cylindrical passage 51 has a relatively large slot 52 directly communicating with the upper portion of the vertical duct. Also, the lower portion of the cylindrical passage 51 is provided with a series of relatively large openings or perforations 53 which directly communicate with the lower portion of the duct. While during the drying operation a major portion of the air entering the lower open end of the vertical duct flows upwardly through the perforations 53, they also provide the means for permitting heavy lint thrown through the opening and the vapor condensed in the duct to pass therethrough and fall downward through its open end, to be collected in a spaced combination heavy lint and moisture collecting tray 54 disposed directly therebelow. While the heavy lint will fall downwardly into the collecting tray, the light airborne lint will travel with the vapor and heated air upwardly through the duct; therefore, a detachable airborne lint trap 56 is mounted in the upper portion of the vertical duct in any suitable manner to filter the vapor and heated air and trap the lint moving therewith.

Figure 3:
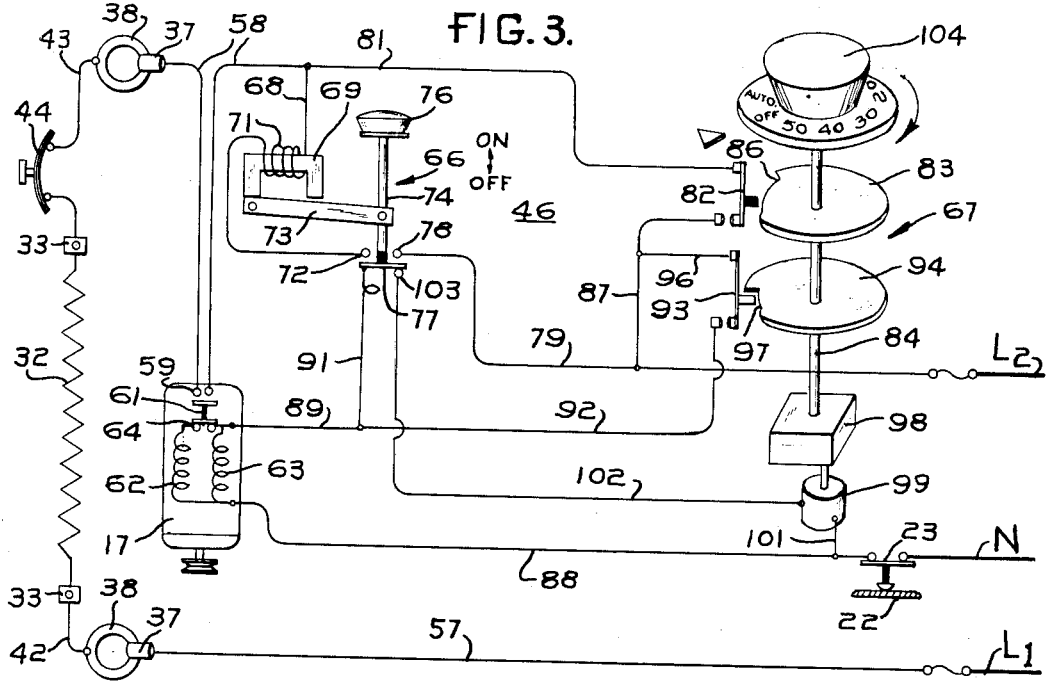
Figure 3 is a schematic wiring diagram of the improved control means utilized to control the clothes drier shown in Figures 1 and 2.

Referring now to Figure 3 for the preferred control arrangement for a clothes drier, there is shown a three-wire circuit having a 230-volt potential drop across the lines $L_1$ and $L_2$ and a third or neutral wire N having a potential drop of 115 volts between either $L_1$ or $L_2$.

Energization of the heating element 32 is from the line $L_1$ through a conductor 57 to one of the brushes 37, and from its cooperating collector ring 38 mounted on the drum to the conductor 42 which is secured to one of the terminals 33. This circuit continues through the stainless steel heating element 32 wrapped about the drum over substantially its entire cylindrical surface to the opposite terminal 33 and the conductor 43 back through the fixed temperature responsive thermostat 44 mounted adjacent the outer periphery of the drum to the other collector ring and brush arrangement 38 and 37, respectively.

From this brush a conductor 58 is connected in series with back contacts 59 mounted on a speed responsive or centrifugally operated switch 61 rotated by the drive motor 17, which has starting and running windings 62 and 63, respectively, with the starting winding 62 being connected in series with the front starting contacts 64 on the centrifugal switch 61. From the conductor 58 energization of the heating element 32 may be accomplished through either a current responsive holding relay 66 or a timer 67. From the conductor 58 the circuit through the holding relay 66 includes a conductor 68 which is wrapped about a U-shaped core 69 to provide a current coil 71 for the core and it extends to a stationary contact 72 within the relay. A pivotally mounted gravity responsive armature 73 is disposed adjacent the open ends of the core to complete the flux path and the outer free end of the armature has secured thereto a vertical shaft or rod 74. This rod has its upper end extending through the top wall 49 of the cabinet with a suitable control knob 76 secured thereto and a movable contact or bridging member 77 at its lower end which is elevated by the knob 76 into contact with the stationary contact 72 and another stationary contact 78 directly connected to the line $L_2$ through a conductor 79 to complete the heating element circuit. The heating element circuit through the timer 67 includes a conductor 81 leading from the conductor 58 and connected to a first or heating element switch 82 operated by a heating element cam 83 secured to a timer shaft 84. This cam is relieved or slotted at 86 to provide for opening and closing of the switch 82 for a purpose to be hereinafter described. The opposite side of the switch 82 has a conductor 87 connected to the conductor 79 to complete the circuit to the line $L_2$.

Thus, it can be seen that the heating element 32 may be energized either by means of the switch 82 on the timer 67 or through the movable contact 77 on the holding relay 66. However, in both cases, energization of the heating element 32 is dependent upon the drive motor 17 attaining a predetermined speed to bridge the back contacts 59 on the centrifugally operated switch 61.

The circuit for energizing the drive motor 17 extends from the neutral N through the door switch 23, conductor 88 to the starting and running windings 62 and 63 on the drive motor, and the opposite sides of the windings are connected to a conductor 89. From the conductor 89 energization of the drive motor 17 may be completed through a flexible conductor 91 connected to the movable contact 77 on the holding relay, the stationary contact 78 and the conductor 79 to the line $L_2$, or to a conductor 92 which is connected to a second or motor switch 93 operated by a motor switch cam 94 mounted on the timer shaft 84 and whose circuit is completed from the opposite side of the switch through a conductor 96 connected to the conductors 87 and 79 back to the line L₂. This cam is likewise slotted at 97 to provide for opening and closing of the motor switch 93 in a manner to be hereinafter described.

Means for driving the timer shaft 84 includes suitable gear reduction mechanism 98 and a timer motor 99. Energization of the timer motor 99 is from the neutral N through the door switch 23, conductor 101 to the timer motor, and from a conductor 102 on the opposite side of the timer to a stationary contact 103 disposed below the movable contact 77 in the holding relay 66 and through the same when it is in its "down" position. From this point the timer is connected in the motor circuit to the line L₂ through the conductors, 91 and 92, motor switch 93 and conductors 96, 87 and 79. In addition, the upper end of the timer shaft 84 extending through the top of the cabinet carries a rotatable knob 104 having indicia thereon to provide for manual rotation of the cams 83 and 94.

From the foregoing, it can be seen that the operator has two different means for energizing the heating element 32, or as will be hereinafter described, a combination of the two, and that the drive motor 17 may be energized through two different circuits extending either through the timer or through the automatic control circuit which includes the holding relay 66.

The operation of a tumbler type clothes drier of the general type hereinabove described and incorporating the conrtol features of this invention for removing moisture from the fabrics is as follows:

The operator opens the door 22 and inserts the damp clothing to be dried into the interior of the imperforate drum 13 through the aligned access openings 19 and 27, respectively. Thereafter, the door is closed which also closes the door switch 23 to condition a portion of the drive motor and timer motor circuits from the neutral N for operation. Assuming the operator prefers to dry the clothing for a specified number of minutes, for example when damp drying is desired, the operator rotates the timer control knob 104 clockwise, as viewed in the drawing, until the proper length of time is opposite the pointer or mark provided on the top 49 of the cabinet and leaves the relay knob 76 in its "down" position. Upon rotating the control knob, the cams 83 and 94 on the timer shaft 84 move their respective switches 82 and 93 to close the contacts.

As soon as the switches are closed the heating element circuit is conditioned for operation and the drive motor circuit is completed from L₂, conductors 79, 87 and 96, switch 93 on the timer, conductors 92 and 89 to one terminal of the drive motor through the starting and running windings 62 and 63 back to conductor 88 through the door switch 23 to the neutral N. Since this circuit is completed the drive motor 17 is energized and begins to rotate and, of course, the drum 13 having the damp fabrics therein is rotated thereby at approximately 30 to 50 R. P. M. When the drive motor attains a predetermined speed, the centrifugal switch 61 mounted in the motor is actuated to cut out the starting winding at the contacts 64 and close the back contacts 59 to complete the circuit to the heating element 32. The heating circuit under these conditions is from L₂, conductors 79 and 87, heating element switch 82, conductors 81 and 58 through the back contacts 59 on the centrifugal switch 61, to one of the collector rings 38, conductor 43, through the thermostat 44, heating element 32, to conductor 42 and the other collector ring and conductor 57 to the line L₁.

Instantaneously, with the energization of the drive motor 17, the timer motor 99 is also energized through the circuit leading from L₂, conductors 79, 87 and 96, switch 93, conductors 92 and 91, movable contact 77 on the holding relay, stationary contact 103, conductor 102 to the timer motor 99, the conductor 101 and through the door switch 23 to the neutral N.

If during the timed drying operation the operator opens the door 22 for any reason, the door switch 23 is automatically opened. Such action, of course, deenergizes the timer and drive motors 99 and 17, and when the speed of the drive motor drops to a predetermined value, the centrifugal switch 61 opens the heating element circuit at the back contacts 59 to deenergize the same. This opening of the heating element circuit is a safety measure to prevent overheating and damage to the clothing. Also, the same operation will take place should the drive motor fail for any reason. As soon as the operator closes the door 22, the door switch 23 is again closed and the timer and drive motors are again energized to continue the drying operation as described above for the prescribed time.

As the clothes are being tumbled and the moisture removed therefrom, the timer is advancing the cams 83 and 94 towards "off" position. Should the major portion of the moisture be removed before the timer deenergizes the heating element circuit at the switch 82, the temperature in the drum will rise to a predetermined high value, whereupon the thermostat 44 will be actuated to open the heating element circuit to prevent overheating of the clothing in the drum. As soon as the temperature in the drum drops below the predetermined value the thermostat acts to again close the circuit to reenergize the heating element and it will thereafter operate in a cycling manner to maintain a relatively constant safe temperature within the drum.

As the timer motor advancing the cams reaches approximately the last 5 minutes of operation, the relief 86 on the cam 83 moves under the switch 82 and permits opening of the same and such action deenergizes the heating element 32 regardless of the demands of the thermostat 44; however, neither the timer motor 99 nor the drive motor 17 are affected and they continue to rotate. This continued tumbling of the clothing after deenergization of the heating element, acts as a means to reduce the temperature of the clothing to a sufficiently low value so they may be readily handled upon completion of the drying operation. At the end of the 5 minute "cooling" interval the timer motor advances the knob 104 to its "off" position which is where the relieved portion 97 on cam 94 opens the switch 93, and such action deenergizes the drive motor 17 and the timer motor 99 and the timed drying operation is now completed. The operator need only open the door and remove the clothing which has been dried for the time selected.

If the operator desires to have the clothes in a relatively complete dried condition, the timer knob 104 is left in its "off" position and the control knob 76 attached to the vertical shaft 74 which carries the movable contact 77 and the armature 73 forming part of the holding relay 66 is manually elevated and held there for a short interval. This upward lifting of the control knob brings the movable contact 77 into engagement with stationary contacts 72 and 78 and energizes the drive motor 17 therethrough from the line L₂, conductors 91 and 89 to the starting and running windings, and through conductor 88 and door switch 23 to the neutral N. When the motor has attained the predetermined speed, the centrifugal switch 61 moves outwardly to engage the back contacts 59 to permit energization of the heating element from the line L₂, conductor 79, stationary contact 78, movable contact 77, contact 72, conductor 68 in the holding relay, conductor 58 including the centrifugal switch contacts 59 and to and from the heating element 32 to the line L₁, as in the previously described operation.

As soon as the heating element is energized, the flow of current through the winding 71 in the holding relay 66 develops magnetic flux in the core 69 and holds the armature 73 with the control shaft in its "up" position so that the movable contact 77 will be held against the stationary contacts 72 and 78 to maintain energization of the heating element. Thereafter the operator releases the control knob. Since the timer is in its "off" position, the motor switch 93 is open and the contact 103 is out of engagement with the movable contact 77, thus the timer motor is inactive or deenergized.

During this automatic operation clothes are tumbled in an identical manner as previously described. When the major portion of the moisture is removed from the clothes, the temperature within the drum 13 begins to increase and upon attaining a predetermined high temperature, corresponding to the dry condition of the clothes, the thermostat 44 is actuated to open the heating element circuit and deenergize the same. This opening of the control circuit interrupts the flow of current through the winding 71 in the holding relay with the consequent collapse of the magnetic field in the core 69 and the armature 73 carrying the movable contact 77 drops by gravity away from the stationary contacts 72 and 78. This action insures the deenergization of the heating element when the thermostat 44 cools and again moves to its closed position and at the same time opens the drive motor circuit. Thus, the drying operation has been completed.

Should the operator open the door at any time during the drying operation, the door switch 23 is opened and the drive motor is deenergized, and the centrifugal switch opens the heating element circuit to deenergize the heating element to prevent damage to the clothing being dried. As the centrifugal switch 61 opens the back contacts 59, the flow of current to the holding relay is interrupted and the armature 73 carrying the movable contact 77 drops by gravity and permanently opens the heating element and motor circuits. Under this condition, in order to continue the drying operation, after the door has been closed again, it is necessary for the operator to lift the control knob 76 upwardly, as was required at the beginning of the automatic operation, until the drive motor has attained enough speed to close the back contacts 59 on the centrifugal switch to permit reenergization of the heating element 32 as mentioned above.

Under normal operating conditions it has been found that at the completion of the automatic drying operation the temperature of the clothing is higher than the operator can handle comfortably; therefore, in order to cool the clothing for handling and eliminate the possibility of complaint at this point, it is desirable to provide a combination control which includes both the timer and automatic feature. Thus, the preferred method of starting the drying cycle is as follows:

The operator rotates the timer dial clockwise until the position marked "automatic" on the dial is opposite the indicator on the top of the cabinet. This corresponds to the point where the relief 86 on the cam 83 opens the heating element switch 82, and the cam 94 maintains the drive and timer motor switch 93 closed. This is the normal position of the timer for the latter portion of the previously described timed control after the heating element has been deenergized. This is the position where the drum 13 is rotated by the drive motor 17 and the timer motor 99 rotates the cams 83 and 94. Thereafter, the operator lifts the control knob 76 "up" to complete the circuit through the holding relay to the heating element 32, and such action holds the movable contact in position against the stationary contacts 72 and 78. This action separates the movable contact 77 from the stationary contact 103 and deenergizes the timer motor 99.

At the completion of the drying operation, as soon as the temperature in the drum reaches a predetermined high value, the fixed temperature responsive thermostat 44 opens the heating element circuit. This interrupts the flow of current to the heating element 32 and deenergizes the holding relay 66 which permits the movable contact 77 to fall by gravity away from the stationary contacts 72 and 78 to permanently open the heating element circuit, and at the same time the movable contact 77 engages the stationary contact 103 to energize the timer motor 99. Dropping of the automatic control knob 76 does not interfere with the drive motor 17 because the drive motor is energized through the motor switch 93 in the timer to the line $L_2$. As soon as the timer is energized it begins to advance the cams and since the heating element 32 is deenergized and remains so, the continued tumbling of the clothing provides a cooling action to reduce their handling temperature. At the end of the predetermined time, set by the timer, the relief 97 on the cam 94 is moved under the switch 93 to open the circuit and deenergize the timer and drive motors, and the knob 104 is in its "off" position. When this occurs, the clothing has been completely dried and cooled to a temperature which may be safely handled by the operator.

During the operation of the first portion of the drying cycle as set forth above, should the operator open the door 22 at any time the door switch 23 is opened to stop the drive motor. Such action also results in opening of the heating element circuit through the centrifugal switch 61 and the holding relay 66 drops out of the circuit. During the latter portion of the drying cycle the timer and drive motors would be deenergized only because the holding relay is normally out of the circuit. Upon closing the door, during the first portion of the drying cycle, the operator would be required to raise the control knob 76 to reenergize the heating element circuit, but during the latter portion the operator need only close the door to continue the cycle.

It is to be noted that the proper sequence must be followed when the combined operation is desired; that is, the timer 67 is first set to its "automatic" position and the automatic control knob 76 is then elevated. This is necessary because the timer circuit takes preference. If the automatic control knob is elevated first, the drying operation is started; however, as the timer knob 104 is advanced to its automatic position, it closes the heating element switch 82 to complete the heating element circuit therethrough and since it parallels with the holding relay 66, the current through the relay drops and permits the movable contact 77 to fall away from the upper stationary contacts. Now, as soon as the timer dial reaches its "automatic" position, the heating element switch 82 is opened, and, unless the automatic control knob 76 is again elevated, the drum is rotated without the application of heat and the timer automatically stops operation of the drive motor after a predetermined length of time.

Figure 4:
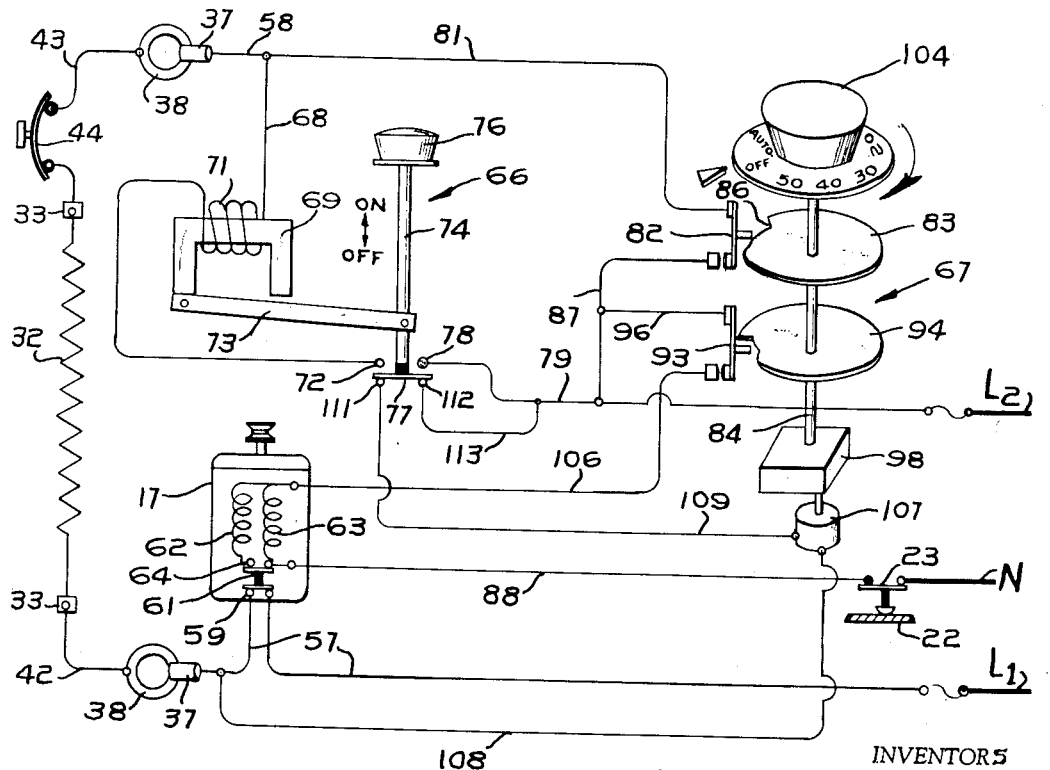
Figure 4 is a schematic wiring diagram of a modified control arrangement for a clothes drier.

In Figure 4 there is shown a modified schematic wiring diagram for the control of the operation of a tumbler type clothes drier which is substantially similar in operation to the aforementioned control, except that the timer motor is designed to operate at 230 volts. Since like parts are given like reference characters, a further detailed description of these parts is not deemed necessary. Energization of the heating element 32 extends from the conductor $L_1$ through the conductor 57 which is connected in series with the back contacts 59 of the centrifugally operated switch 61 mounted on the drive motor 17. The opposite end of the conductor is connected to one of the brushes 37 of the collector ring assembly which in turn is connected to the heating element 32 and in series with the temperature responsive thermostat 44 to the other brush. From the conductor 58 leading from this brush the circuit is divided to either pass through the holding relay 66, the contacts 72 and 78 to $L_2$ to complete the circuit, or through the heating element switch 82 on the timer 67 and conductors 87 and 79, to the line $L_2$, as previously described.

The drive motor 17 is, in this instance, energized from the neutral N, the door switch 23, conductor 88 through the field windings 62 and 63 and a conductor 106 to the motor switch 93 on the timer 67, which in turn is directly connected to the line $L_2$ through the conductors 96, 87 and 79.

A 230 volt timer motor 107 for operating the timer 67 has a conductor 108 connected to the conductor 57 between the collector ring assembly 35 and the centrifugally operated switch 61 and its other conductor 109 connected to a lower stationary contact 111 in the holding relay below the movable contact 77. Another lower stationary contact 112 has a conductor 113 leading therefrom connected to the line L₂ through the conductor 79.

Assuming the drying process is in operation with the control knob 76 elevated, whenever the movable contact 77 in the holding relay drops and bridges the lower stationary contacts 111 and 112, the timer motor 107 is energized to drive the timer in a manner identical with the previously described arrangement, the only exception being that the timer motor is energized from the lines L₁ and L₂ instead of from one of these to the neutral N. In view of this, a more detailed description of the operation is not deemed necessary.

From the foregoing it can be seen that a control arrangement for a tumbler type clothes drier has been provided which may be operated in several different ways dependent upon the desires of the operator. Also, that a manually operated holding relay has been provided which is operative to insure deenergization of the heating element when a predetermined temperature has been reached in the drum and that the holding relay is effective to permanently deenergize the heating element should any unusual circumstance arise which would cause temporary current failure. In addition, a centrifugally operated switch has been provided which prevents energization of the heating element until the drive motor has attained a predetermined speed. This control arrangement may be manually operated for a timed drying period, an automatic dry period or a combination of automatic drying and timed cooling, dependent upon the desires of the operator.

While we have herein described and upon the drawings shown illustrative embodiments of the invention, it is to be understood that the invention is not limited thereto but may comprehend other constructions, arrangement of parts, details and features without departing from the spirit of the invention.

It is claimed:

1. In control mechanism for a clothes drier having a rotatable drum, the combination of drive means for said rotatable drum, a heating element carried by said drum for evaporating the moisture in the clothes, a manually operated holding relay for energizing said heating element and said drive means, and a fixed temperature responsive thermostat mounted on said drum and responsive to the temperature therein for deenergizing said heating element and said holding relay, said relay being operative upon deenergization to terminate operation of said drive means.

2. In a control for a clothes drier having a substantially imperforate drum mounted for rotation about a horizontal axis, the combination of means for rotating said drum, a heating element wrapped about the periphery of said drum, manual means for energizing said heating element and said rotating means, a fixed temperature responsive thermostat secured to said drum and responsive at a predetermined high temperature therein to deenergize said heating element and said energizing means, and means including a timer for maintaining said rotating means operative for a predetermined length of time after said thermostat deenergizes said heating element and said energizing means.

3. In a control for a clothes drier having a drum mounted for rotation about a horizontal axis, the combination of a heating element mounted on the exterior of said drum and rotatable therewith, electric drive means for rotating said drum about its horizontal axis, manually operated means for energizing said drive means and said heating element, and a fixed temperature responsive thermostat carried in the sidewall of said drum and responsive to the temperature therein and operative when the temperature exceeds a predetermined value to deenergize said heating element and said manually operated means.

4. In a control for a clothes drier including a drum mounted for rotation on a horizontal axis, the combination of electric drive means for rotating said drum on its horizontal axis, heating means disposed about said drum and rotatable therewith, a relay for energizing said drive means and said heating means, a fixed temperature responsive thermostat mounted on said drum to deenergize said heating element and said relay when the temperature in said drum reaches a predetermined value, and a timer operative when said relay is deenergized for continuing the rotation of said drum for a predetermined period of time.

5. In a control mechanism for a clothes drier having motor driven means for tumbling the clothing and means for heating the clothes, the combination of a gravity responsive holding relay comprising an energizing winding in series with said heating means, a movable armature associated with said winding, contacts associated with said armature, a manually movable member secured to said armature, said manually movable member being shiftable to a position to energize said drive means and heating means through said contacts and being retained in said position upon energization of said heating means by said movable armature, and means responsive to an interruption of current to said heating means for deenergizing said holding relay to open said contacts to prevent further energization of said heating means.

6. In clothes drying apparatus, the combination of means defining a drying chamber for the clothing, a motor for rotating said means to agitate the clothing, means for heating the clothing in said chamber, and control means for initiating and terminating operation of said motor and heating means, said control means including a switch having contacts in series with said heating means and responsive to the speed of said motor, a holding relay having a core winding and contacts in series with said heating means and motor, a manually movable armature associated with said contacts, means for manually moving said armature to a first position to bridge said contacts to energize said motor and said heating means until said motor attains a predetermined speed after which said core winding holds said armature in said first position to bridge said relay contacts to maintain said heating means energized, temperature responsive means for deenergizing said heating means and said holding relay, said armature being movable upon deenergization to a second position, and a timer including a timer motor operative when said armature moves to its second position for continuing operation of said motor for a predetermined length of time.

7. In control mechanism for a clothes drier having a motor for tumbling the clothes and means for heating the clothes, the combination of a switch having contacts in series with said heating means and responsive to the speed of said motor, a gravity responsive holding relay including a movable armature and a core with a winding in series with said heating means, said relay further including contacts associated with said armature for energizing said heating means and motor, manual means for moving said armature to a first position to energize said motor and said heating means through said contacts and when said motor means attains a predetermined speed, said armature being held in the energizing position by the current flowing to said heating means, a thermostat responsive to a predetermined temperature within the drier for deenergizing said heating means and said relay, said armature being movable to a second position upon deenergization to continue operation of said motor, switch means for controlling said motor, and a timer energized when said relay moves to its second position to deenergize said motor after a predetermined length of time through said last mentioned switch means.

8. In control mechanism for a clothes drier having means for tumbling the clothes, the combination of a motor for tumbling the clothes, means for heating the clothes, a centrifugally operated switch in series with said heating means and responsive to a predetermined speed of said motor to close said switch, a gravity responsive holding relay including a movable armature and a core with a winding in series with said heating means, said relay further including upper and lower contacts associated with said armature for energizing said motor and heating means, manual means for elevating said armature to a first position to energize said motor and said heating element through said upper contacts and when said motor attains the predetermined speed, said armature being held in the energizing position by the current flowing to said heating means, a thermostat responsive to a predetermined high temperature within the tumbling means for deenergizing said heating means and said relay, said relay being movable to a second position upon deenergization to engage said lower contacts to continue operation of said motor, a timer motor energized through said lower contacts in said relay, and switch means operated by said timer motor for terminating operation of said motor and timer motor after a predetermined length of time.

9. In a clothes drier, the combination of a horizontally rotatable imperforate drum for receiving the clothes to be dried, a drive motor for rotating said drum, a heating element carried on said drum and rotatable therewith, means for supplying electrical energy to said heating element, a centrifugally operated switch having contacts in series with said heating element carried by said motor and responsive above a predetermined speed of the same to close said contacts, a gravity responsive relay including a movable armature and a core with a winding in series with said heating element, said relay further including upper contacts associated with said armature for energizing said motor and heating element, said relay further including a lower contact associated with said armature, manual means for elevating said armature to a first position to energize said motor and said heating element through said upper contacts and when said heating element has been energized upon closing of said centrifugally operated switch contacts being held in the energizing position by the current flowing to said heating element, a fixed thermostat carried by said drum and responsive to a predetermined high temperature therein for deenergizing said heating element and said holding relay, said armature in said relay being movable by gravity to a second position to maintain said heating element deenergized, a timer motor energized upon movement of said armature to its second position to close said lower contact, and switch means operated by said timer motor to terminate operation of the same and said drive motor after a predetermined length of time.

10. In a clothes drier, a clothes drum, drive means including a drive circuit for driving said drum, heating means for evaporating moisture from damp fabrics placed within said drum, a thermally sensitive switch responsive to heat within said drum and operable to open at a predetermined drying temperature within said drum, a solenoid controlled by said thermally sensitive switch, said solenoid controlling the energization of said heating means, a solenoid circuit including a switch for energizing said solenoid, timer means including switch means for automatically opening said drive circuit and de-energizing said drive means a predetermined period of time after energization of said timer means, a timer circuit including a switch for energizing said timer means, and armature means for said solenoid, said armature means being manually movable to a first position to close said switch in said solenoid circuit for energizing said solenoid and automatically movable into a second position upon de-energization of said solenoid by said thermally sensitive switch to open said switch in said solenoid circuit and to close said switch in said timer circuit for energizing said timer means.

References Cited in the file of this patent

UNITED STATES PATENTS

| | | |
|---|---|---|
| 1,509,869 | Harvey | Sept. 30, 1924 |
| 1,675,160 | Carroll | June 26, 1928 |
| 2,070,491 | Park | Feb. 9, 1937 |
| 2,314,748 | White | Mar. 23, 1943 |
| 2,505,041 | Gorsuch | Apr. 25, 1950 |
| 2,577,104 | Butler | Dec. 4, 1951 |
| 2,590,808 | Wagner | Mar. 25, 1952 |